United States Patent [19]
Morita

[11] Patent Number: 5,295,706
[45] Date of Patent: Mar. 22, 1994

[54] AIR BAG

[75] Inventor: Kazuo Morita, Shiga, Japan

[73] Assignee: Takata Corporation, Tokyo, Japan

[21] Appl. No.: 868,979

[22] Filed: Apr. 16, 1992

[30] Foreign Application Priority Data

May 20, 1991 [JP] Japan .................. 3-114611

[51] Int. Cl.⁵ ............................................. B60R 21/16
[52] U.S. Cl. .............................................. 280/728 A
[58] Field of Search ............ 280/743, 728, 741, 730, 280/731, 732, 728 R, 728 A, 730 R, 743 R

[56] References Cited

U.S. PATENT DOCUMENTS

| | | | |
|---|---|---|---|
| 4,830,401 | 5/1989 | Honda | 280/736 |
| 4,988,119 | 1/1991 | Hartmeyer | 280/743 |
| 5,064,218 | 11/1991 | Hartmeyer | 280/743 |
| 5,118,133 | 6/1992 | Zushi et al. | 280/728 |

FOREIGN PATENT DOCUMENTS

| | | |
|---|---|---|
| 0364267 | 4/1990 | European Pat. Off. . |
| 0380699 | 8/1990 | European Pat. Off. . |
| 2335373 | 7/1977 | France . |
| WO9009295 | 8/1990 | PCT Int'l Appl. . |

Primary Examiner—Margaret A. Focarino
Assistant Examiner—Paul Dickson
Attorney, Agent, or Firm—Kanesaka & Takeuchi

[57] ABSTRACT

In an air bag having a gas introducing opening for gas from an inflator, a synthetic resin molded member is provided on each face of a marginal portion of the gas introducing opening, and the synthetic resin molded members are coupled to each other. One of the synthetic resin molded members is formed with protrusions, and the other synthetic resin member has engaging holes corresponding to the protrusions. The protrusions are inserted in the engaging holes through holes formed through a cloth portion of the air bag, and welded to the engaging holes.

6 Claims, 5 Drawing Sheets

AIR BAG

FIELD OF THE INVENTION

This invention relates to an air bag for use in an air bag device which expands to protect an occupant when a vehicle collides.

RELATED ART

An air bag device mounted to a car body in front of a seat operates such that in case of emergency, for example, when a vehicle collides, an air bag inflates (and expands) instantly in response to the pressure of a reaction gas discharged from a gas generator secured to a steering wheel or dashboard, thereby protecting an occupant.

FIG. 6 is a sectional view showing a conventional air bag device, and FIG. 7 is an enlarged sectional view showing the portion A of FIG. 6.

In these drawings, reference numeral 10 denotes an air bag attaching member called a retainer, and an inflator 14 is fitted in an inflator attaching opening 12 formed at the center of the retainer 10.

An air bag 16 is formed with an accepting opening 18 in which the working end of the inflator 14 is fitted, this accepting opening 18 being aligned with the attaching opening 12. The accepting opening 18 serves also as a gas introducing opening for introduction of the gas discharged from the inflator 14 into the air bag 16. The air bag 16 is secured to the retainer 10 by pressing a marginal portion of the accepting opening 18 of the air bag 16 against a marginal portion of the attaching opening 12 by means of a holding ring 20.

The air bag 16 is expandably folded and covered with a module cover 22. This module cover 22 ruptures in response to the inflating pressure of the air bag 16 that appears when the air bag 16 is expanded by the gas discharged from the inflator 14.

The holding ring 20 is generally secured to the retainer 10 by rivets (especially, blind rivets) 24 or screws (not shown).

Stud bolts may be used which are secured to the holding ring 20 and passed through bolt holes of the retainer 10 as to project downward in FIGS. 6 and 7. Such bolts are used preferably in attaching the inflator to the retainer.

In the foregoing air bag attaching structure of the conventional air bag device, the air bag is formed with holes in which fixing elements, such as rivets, screws or bolts, are inserted, and the retainer has holes formed therein correspondingly to the holes of the air bag in which the fixing elements are also inserted. Therefore, when assembling the air bag device, the bolts, screws or rivets must be inserted in the fixing element insertion holes after the fixing element insertion holes of the air bag are aligned with those of the retainer. However, it is very difficult to bring the holes of the air bag (made of cloth) into strict alignment with those of the retainer. Consequently, a marginal portion of some hole of the cloth-made air bag is liable to enter the corresponding hole of the retainer. Accordingly, the conventional air bag attaching structure of the air bag device is poor in the efficiency of assembly of the air bag device.

OBJECT AND SUMMARY OF THE INVENTION

It is an object of the present invention to provide an air bag wherein a marginal portion of a gas introducing opening of the air bag is reinforced so that its attaching strength is high.

According to a feature of the present invention, an air bag formed with a gas introducing opening for introduction of the gas discharged from an inflator is characterized in that each face of a marginal portion of the gas introducing opening has a member molded of synthetic resin.

In the air bag according to the present invention, since the synthetic resin molded member is provided on each face of the marginal portion of the gas introducing opening, the air bag has rigidity in its opening marginal portion, thereby facilitating the step of securing the air bag.

In the air bag according to the present invention, since a cloth of the marginal portion of the gas introducing portion is pinched between the synthetic resin molded members, the cloth of the marginal portion is prevented from entering fixing element insertion holes of a retainer, thereby assembling the air bag device in a short time.

In the air bag according to the present invention, since the marginal portion of the gas introducing opening is reinforced by the members molded of synthetic resin, the air bag is firmly secured by elements passed through the marginal portion, such as pins, bolts or screws.

In the air bag according to the present invention, preferably, one of the synthetic resin molded members is formed with protrusions, and the other synthetic resin molded member has engaging holes corresponding to the protrusions. The protrusions are inserted in the engaging holes through holes formed through the cloth of the air bag and welded to the engaging holes. Therefore, the synthetic resin molded members can be easily coupled to each other.

DESCRIPTION OF THE PREFERRED EMBODIMENTS

Embodiments of the present invention will now be described with reference to the drawings.

Figure 2:
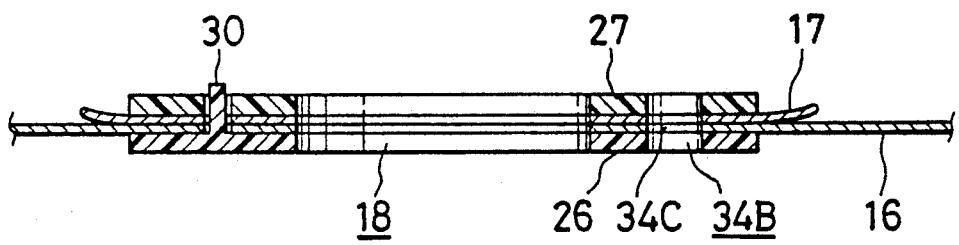
FIG. 2 is a sectional view of an air bag, which is being assembled, taken along the line B—B of FIG. 1.
Figure 3:
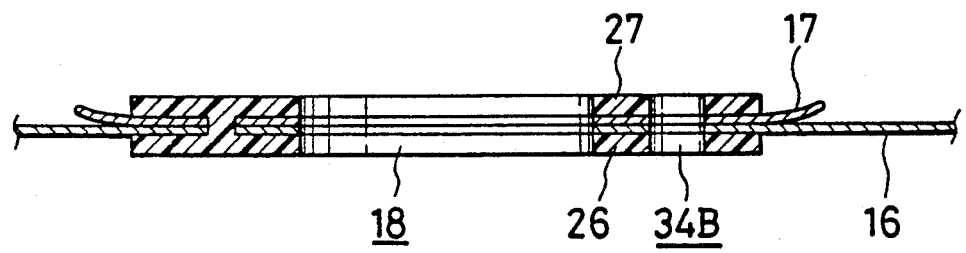
FIG. 3 is a sectional view of an assembled air bag.

In this embodiment, a ring-shaped reinforcing cloth 17 is provided on a marginal portion of a gas introducing opening 18 of an air bag 16. Ring-shaped members 26 and 27 formed by injection molding of synthetic resin are provided on both faces of the marginal portion so as to pinch a base cloth of the air bag 16 therebetween. One of the synthetic resin molded members 26 has eight protrusions 30, and the other synthetic resin molded member 27 has engaging holes 31 formed correspondingly to the protrusions 30. The base cloth of the air bag 16 and the reinforcing cloth 17 each have through holes 32 formed therein correspondingly to the protrusions 30 and the engaging holes 31. The protrusions 30 are passed through the through holes 32, and the leading ends of the protrusions 30 are inserted in the engaging holes 31 (as shown in FIG. 2). The protrusions 30 are, as shown in FIG. 3, secured to the engaging holes 31 by welding like ultrasonic welding, adhesion using an adhesive or the like (by welding in this embodiment), so that a pair of synthetic resin molded members 26 and 27 are made integral together with the base cloth of the air bag 16 and the reinforcing cloth 17 pinched between them. The protrusions 30 are flush with an outer surface of the synthetic resin molded member 27 without projecting outwardly therefrom, as shown in FIG. 3.

Figure 1:
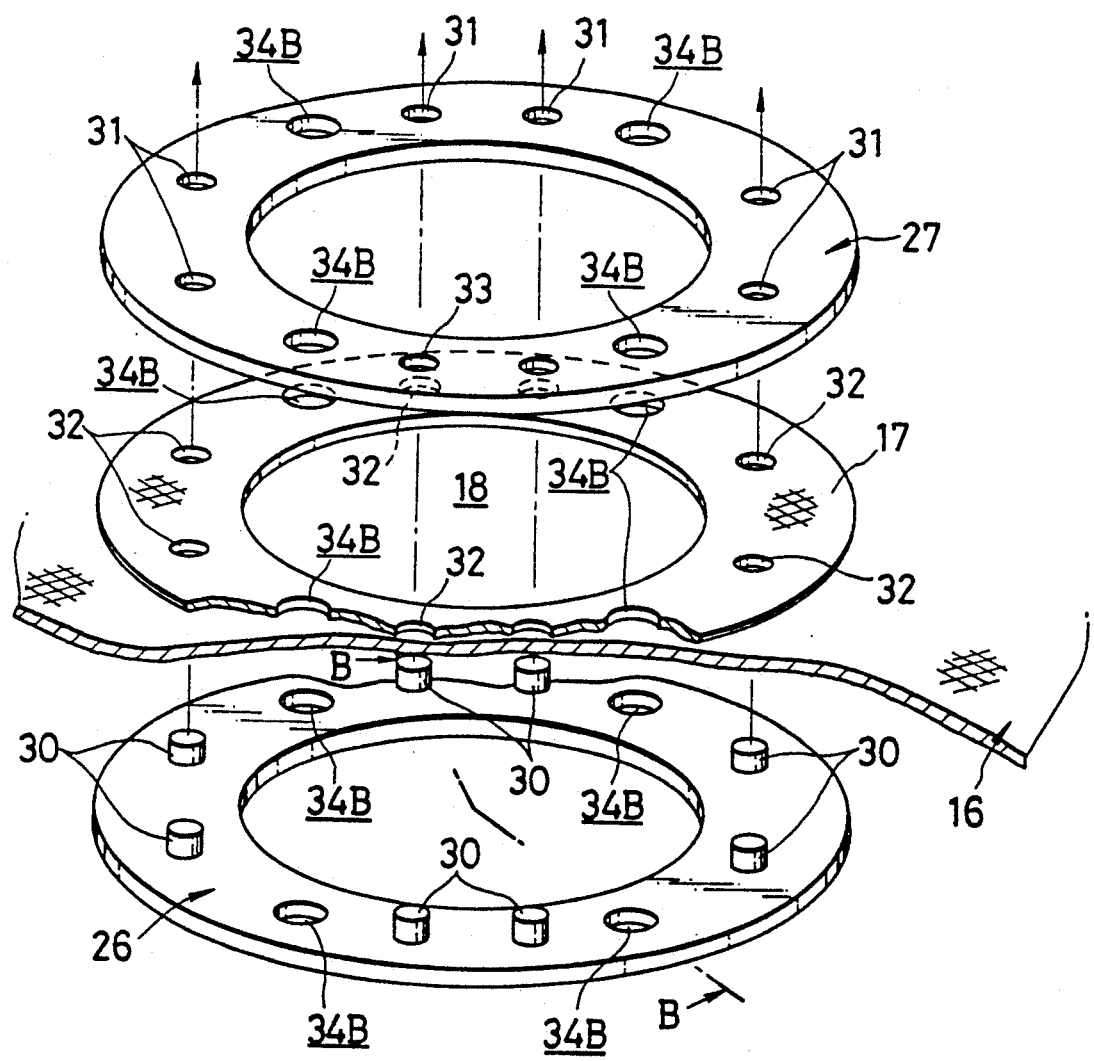
FIG. 1 is a perspective view showing the construction of an embodiment of the present invention.

When incorporated into an air bag device for a driver's seat, the air bag having the above construction is mounted to a retainer by means of, for example, a proper holding ring. Reference numeral 34B in FIGS. 1 to 3 denote bolt holes for attaching the air bag to the retainer.

Figure 4:
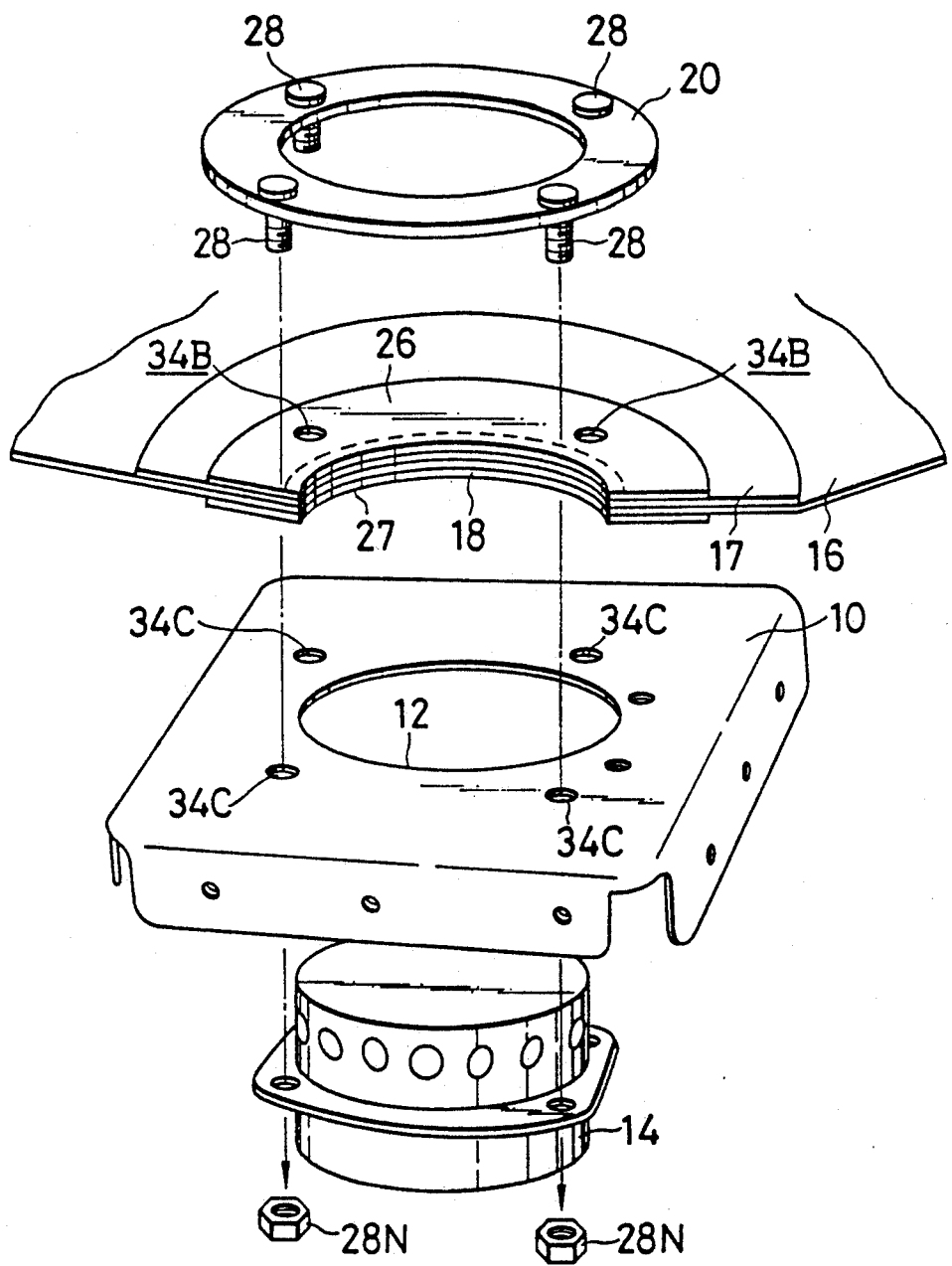
FIG. 4 is an exploded view of an air bag device.

FIG. 4 shows an embodiment of the air bag attaching structure.

A holding ring 20 has stud bolts 28. The number of the stud bolts 28 is four in the embodiment.

A retainer 10 is formed with four bolt holes 34C in which the stud bolts 28 are inserted.

The air bag 16 is placed on the retainer 10 such that the gas introducing opening 18 of the air bag 16 becomes concentric with an inflator attaching opening 12 of the retainer 10, and then, the holding ring 20 is superposed from above. After the stud bolts 28 are passed through the bolt holes 34B and 34C, inflator securing nuts 28N are firmly tightened to the stud bolts 28. As a result, the inflator 14 is rigidly attached to the retainer 10, and the air bag 16 is pinched between the holding ring 20 and the retainer 10.

For the purpose of attachment of the air bag 16, the rigidity of the marginal portion of the gas introducing opening 18 of the air bag 16 is increased by incorporation of synthetic resin. Therefore, the holes 34B and 34C can readily be aligned positionally together, this increasing the efficiency of assembly work.

In the foregoing air bag attaching structure, the synthetic resin molded members 26 and 27 are secured to the air bag 16, this reinforcing the marginal portion of the gas introducing opening 18 of the air bag 16 and distributing a force acting on the opening marginal portion of the air bag 16 to cause the air bag 16 to come off over the whole opening marginal portion. Therefore, the air bag 16 is surely prevented from coming off and breaking down.

As will be clear from FIG. 4, this embodiment uses no blind rivets, this saving the labor for riveting, increasing the efficiency of manufacture and decreasing the cost of rivet material.

Figure 5:
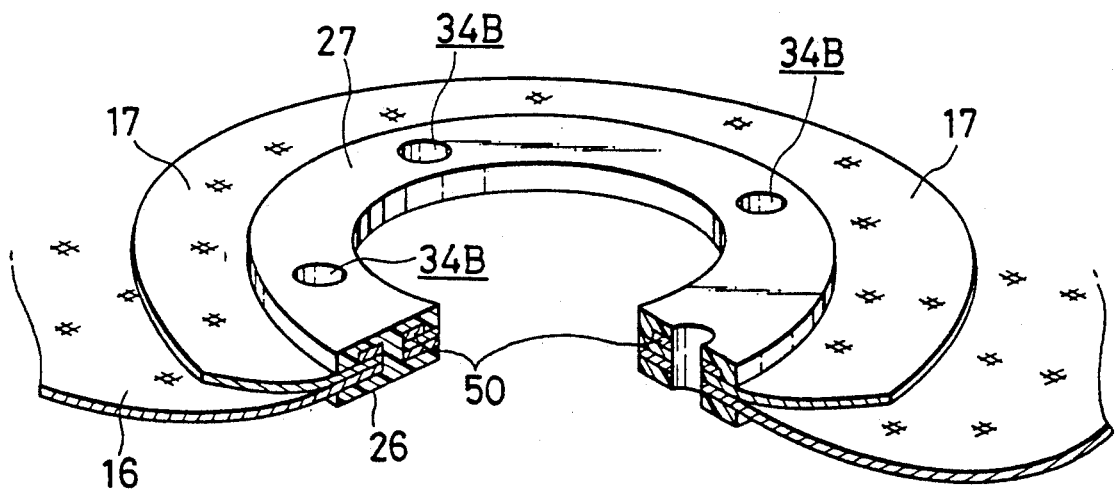
FIG. 5 is a view showing the construction of the principal part of a further embodiment.
Figure 6:
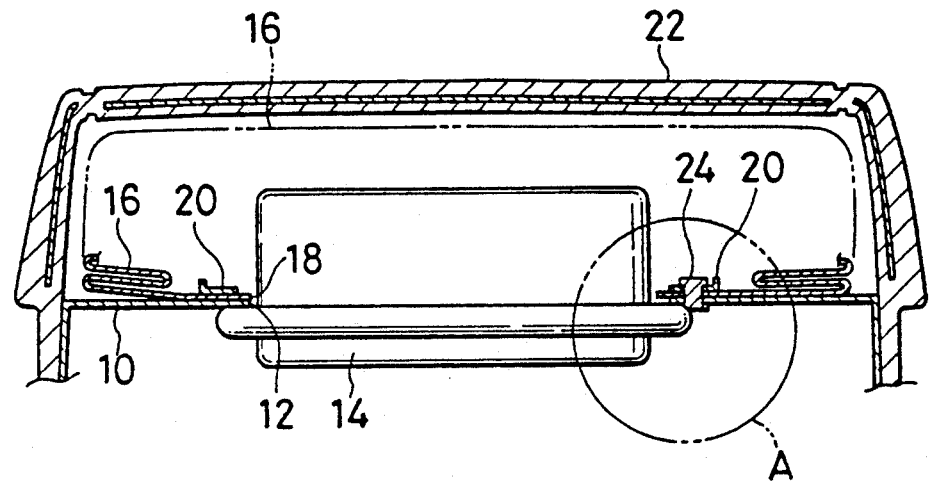
FIG. 6 is a longitudinal sectional view of a conventional air bag device.
Figure 7:
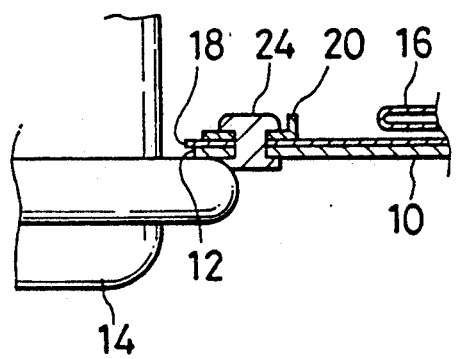
FIG. 7 is an enlarged sectional view of the principal part of FIG. 6.

In the present invention, as shown in FIG. 5, the synthetic resin molded members 26 and 27 may be reinforced by embedding a reinforcing member (for example, an iron ring) 50 in one or both of the synthetic resin molded members 26 and 27 by insert molding or the like.

Although the above embodiment secures the holding ring 20 to the retainer 10 with no use of blind rivets, a few rivets or screws may be used additionally.

As described above, according to an air bag of the present invention, since synthetic resin members are mounted to a marginal portion of a gas introducing opening, the air bag is reinforced, and the attachment strength of the air bag is high. Furthermore, the attachment of the synthetic resin members is readily performed.

What is claimed is:
1. An air bag made of cloth, comprising:
   a gas introducing opening for receiving gas from an inflator;
   a marginal portion formed around the gas introducing opening and having two faces;
   a ring-shaped reinforcing cloth superposed on one face of the marginal portion of said gas introducing opening;
   a first ring-shaped synthetic resin molded member placed on said reinforcing cloth;
   a second ring-shaped synthetic resin molded member placed on the other face of said marginal portion of said gas introducing opening;
   a plurality of protrusions integrally formed on one of said synthetic resin molded members to project in a direction toward the other of the synthetic resin molded members;
   a plurality of engaging holes formed on the other synthetic resin molded member at portions corresponding to the protrusions;
   holes formed in said reinforcing cloth and said marginal portion of the air bag at portions corresponding to the protrusions; and
   a plurality of through holes formed in said marginal portion of the air bag, the reinforcing cloth and the first and second ring-shaped synthetic resin molded members,
   said protrusions, when the air bag is formed, being inserted in said engaging holes through said holes of the reinforcing cloth and the marginal portion, and integrally secured to said other synthetic resin molded member, said protrusions being flush with an outer surface of said other synthetic resin molded member without projecting outwardly therefrom so that the through holes are aligned to allow bolts for attaching the air bar to a retainer to pass therethrough and the air bag is easily assembled with the retainer and the inflator.

2. An air bag according to claim 1, wherein said protrusions are secured to said other synthetic resin molded member by welding and adhesion.

3. An air bag according to claim 1, wherein at least one of said synthetic resin molded members is reinforced by a reinforcing member.

4. An air bag according to claim 3, wherein said reinforcing member is a metal ring.

5. An air bag assembly, comprising:
   a retainer having an opening;
   an inflator attached to the retainer to be disposed in the opening;
   an air bag made of a cloth and including a gas introducing opening for receiving the inflator therein, a marginal portion formed around the gas introducing opening and having two faces, a plurality of holes and through holes formed at the marginal portion, said marginal portion being fixed to the retainer;
   a first ring-shaped synthetic resin molded member placed on one of the faces of the marginal portion, said first molded member having a plurality of engaging holes and through holes corresponding to the respective holes and through holes at the marginal portion;
   a second ring-shaped synthetic resin molded member placed on the other of the faces of the marginal portion, said second molded member having a plurality of through holes corresponding to the through holes at the marginal portion and a plurality of protrusions projecting in a direction toward the first molded member and formed at portions corresponding to the engaging holes of the first molded member, said protrusions being inserted into the engaging holes of the first molded member through the holes at the marginal portion of the air bag and integrally connected to the engaging holes so that the protrusions are flush with an outer surface of the first molded member without projecting outwardly therefrom, said through holes of the air bag and the first and second molded members being aligned together when the first and second molded members are assembled with the air bag; and a holding ring with stud bolts, said holding ring, when the air bag is assembled, being placed on one of the first and second molded members to allow the stud bolts to pass through the through holes of the air bag and the first and second molded members, said bolts being connected to the retainer so that the air bag is easily assembled with the retainer and the inflator.

6. An air bag assembly according to claim 5, further comprising a ring-shaped reinforcing cloth superposed on one of the faces of the marginal portion of the gas introducing opening and having a plurality of holes and through holes corresponding to those at the marginal portion.

* * * * *